United States Patent [19]

Littlehale

[11] 4,321,937
[45] Mar. 30, 1982

[54] AUTOMATIC LIQUID DELIVERY APPARATUS

[76] Inventor: Bradner M. Littlehale, 751 Fairmount Ave., Chatham, N.J. 07928

[21] Appl. No.: 15,775

[22] Filed: Feb. 28, 1979

[51] Int. Cl.³ .............................................. A01G 25/00
[52] U.S. Cl. .................................... 137/78.3; 239/63; 47/48.5
[58] Field of Search ................ 137/78 R, 78 A, 78 C, 137/78 D; 47/48.5, 79, 80; 239/63

[56] References Cited

U.S. PATENT DOCUMENTS 3,438,575  4/1969  Rohling ............................. 239/63 X
3,981,446  9/1976  Hunter ............................... 239/63 X

*Primary Examiner*—A. Michael Chambers
*Attorney, Agent, or Firm*—Carroll B. Quaintance; Andrew James Richardson; Revere B. Gurley

[57] ABSTRACT

An automatic liquid delivery apparatus dispenses liquid from a liquid container or other liquid supply to a receiver or zone requiring liquid in response to a detector which is located in the zone and initiates discharge of the liquid. The liquid is retained against discharge from the container or supply by air pressure in a liquid passage and is discharged upon release of the air through the detector, when liquid is needed in the receiver or zone.

The automatic liquid delivery apparatus in a liquid feeding system may be used to supply liquid to growing plants; a detector for each plant or group of plants initiates the dispensing of liquid by a delivery apparatus, each detector sensing the moisture requirements of a particular plant.

The automatic liquid delivery apparatus includes a valve device which retains liquid against discharge from a container or supply by air pressure confined in a space in a passage, and delivers liquid through the passage when the air in the space is released by a control device, which may be a detecting mechanism or other automatic operating element.

11 Claims, 9 Drawing Figures

To Supply    To Plant    To 14

AUTOMATIC LIQUID DELIVERY APPARATUS

The automatic liquid delivery apparatus invented by applicant will maintain a constant amount of moisture or free liquid automatically, as in a liquid feeding system for a number of plants in a house or greenhouse. With this apparatus, the proper degree of moisture or free liquid as needed by each plant is maintained automatically by connection to any available source of liquid, and no attention is necessary as long as liquid is available.

In the liquid feeding system for plants, each automatic liquid delivery apparatus is controlled by a detector so placed that it will sense the lack of moisture needed by the plant and will initiate actuation of the automatic liquid delivery apparatus to feed liquid to the plant until the detector is contacted by sufficient moisture to cut off feeding of the liquid. This detector is tailored to adapt to the moisture requirements of the plant to allow only slight moisture or to add liquid until it rises to the required level. Thus, dry soil plants and plants grown hydroponically are furnished the proper amount of liquid, the detector for each plant or group of plants being selected to sense the degree of moisture required.

In the automatic liquid delivery apparatus, a quantity of liquid is held against discharge from a container by air pressure in a space or chamber in a discharge passage, so that the liquid is discharged into the passage upon release of air from the chamber. A detector located in a liquid receiver, as in a growing medium for plants, is closed by liquid to maintain the air pressure in the chamber. When the liquid is depleted and the detector senses the lack of moisture, air will pass through the detector from the chamber, and, when the air is released, the liquid will be discharged to flow from the container through the passage to the growing medium. The container is refilled, and this action is repeated until sufficient moisture or liquid is fed to the growing medium to close the detector to the passage of air, thereby confining air in the chamber of the discharge passage. The liquid in the container of the automatic liquid delivery element is then retained until the liquid in the growing medium is depleted and the detector again senses the lack of sufficient liquid or moisture.

Figure 6:
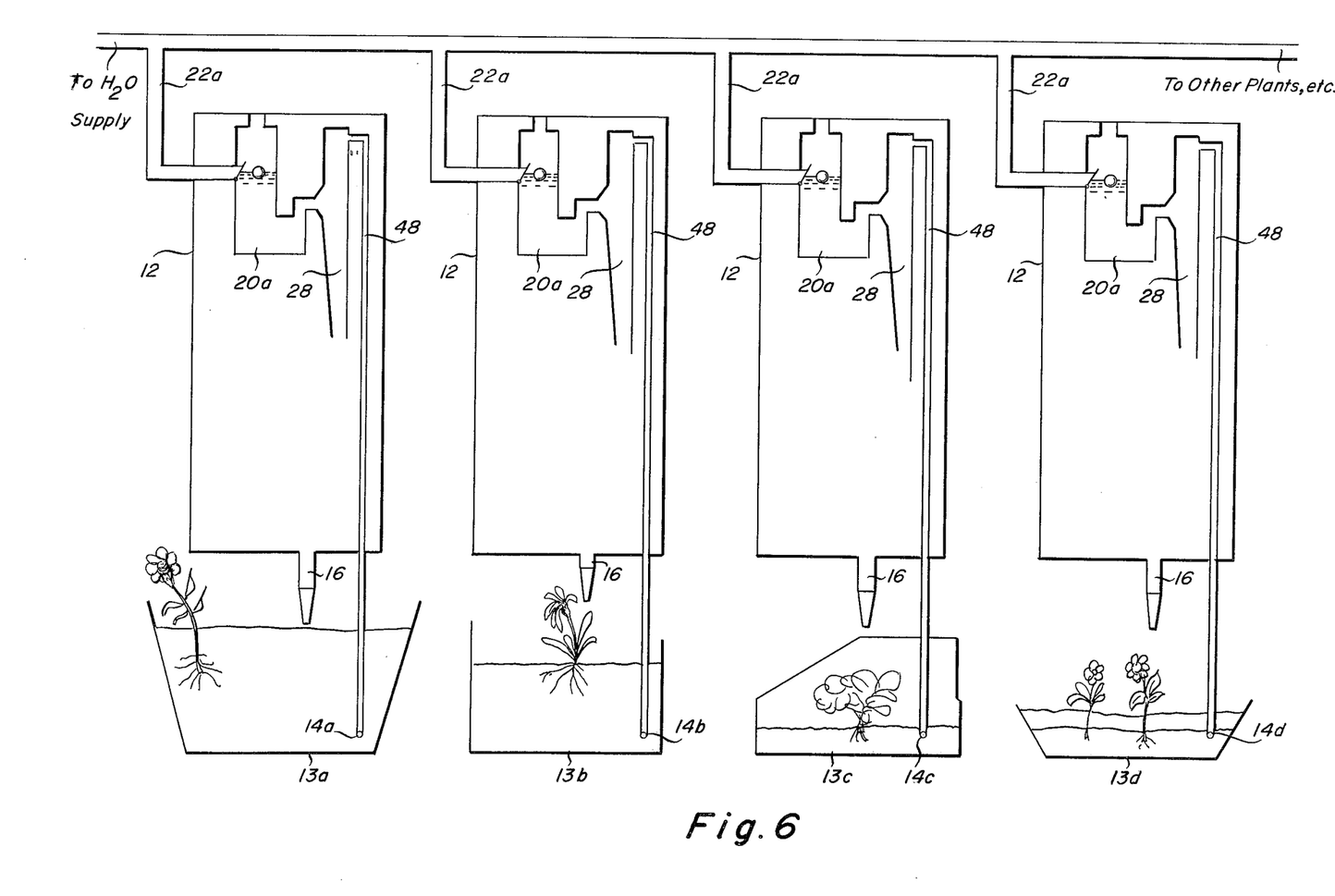
FIG. 6 shows a liquid feeding system with a plurality of apparatus for a plurality of plants.

An example of a system using the automatic liquid delivery apparatus is illustrated in FIG. 6 of the drawings, showing a variety of plants, each of which is fed with the delivery apparatus connected to a water line. These plants may be cacti, which require only slight moisture, plants requiring much moisture, or hydroponically grown plants, each detector being designed to sense the proper amount of moisture for the plant fed by an apparatus.

The automatic liquid delivery apparatus may also activate an auxiliary liquid supply in a container for dispensing a large quantity of liquid in one operation. In this supplemental supply system, a siphon is activated by the delivery apparatus to dispense liquid from the supplemental supply to the intended liquid use.

The volume of liquid dispensed by the automatic liquid delivery apparatus may also be varied by the provision of several containers operating as the liquid supply. These containers are selectively connected so that any number of them will discharge liquid at each operation of the delivery apparatus.

In one form of the invention, the automatic liquid delivery apparatus may be constructed of plastic film in which the passages and chambers are embossed and sealed, and can be produced to completion on automatic machinery at high speed and low cost. The apparatus can also be fabricated in a unit combining a plant container and liquid reservoir. In this case, or when the apparatus is placed in the growth medium, the detector may be attached directly to the valve, and separate conduits for outflow of air and liquid are not needed.

The operation of the valve device controlling discharge of liquid from the container or other liquid supply is basic to the apparatus and feeding system. This valve device is illustrated as structurally associated with a liquid container, as one form of construction for use in the plant feeding system. The principle of this liquid control may be utilized for liquid control in other systems, the valve device being capable of controlling flow from other forms of container or supply.

Since this automatic liquid delivery apparatus depends on air pressure in a small air chamber to control liquid flow, it is independent of the volume of liquid controlled and of surrounding atmospheric pressure and temperature. The detector only releases air pressure in the chamber when liquid is needed, assuring proper operation under all conditions, while the emission of air through the detector will prevent clogging of the detector element and misfunction of the apparatus.

While useful especially for growing plants, the liquid delivery apparatus may find many other applications where either a liquid level or a moisture content must be maintained, as in humidifiers, cooking pots, various processes and other operations. For other purposes, the detector may be designed to sense other conditions, resulting in the dispensing of liquid when the condition causes the detector to open to emit air from the apparatus. Further, the control of the discharge of liquid by release of air pressure may be applicable for other purposes where liquid flow is to be controlled by other types of automatic control means, or by manual operation, and other gaseous substances may be used in place of air.

DESCRIPTION OF APPARATUS

Figures 1, 3, 4, 5:
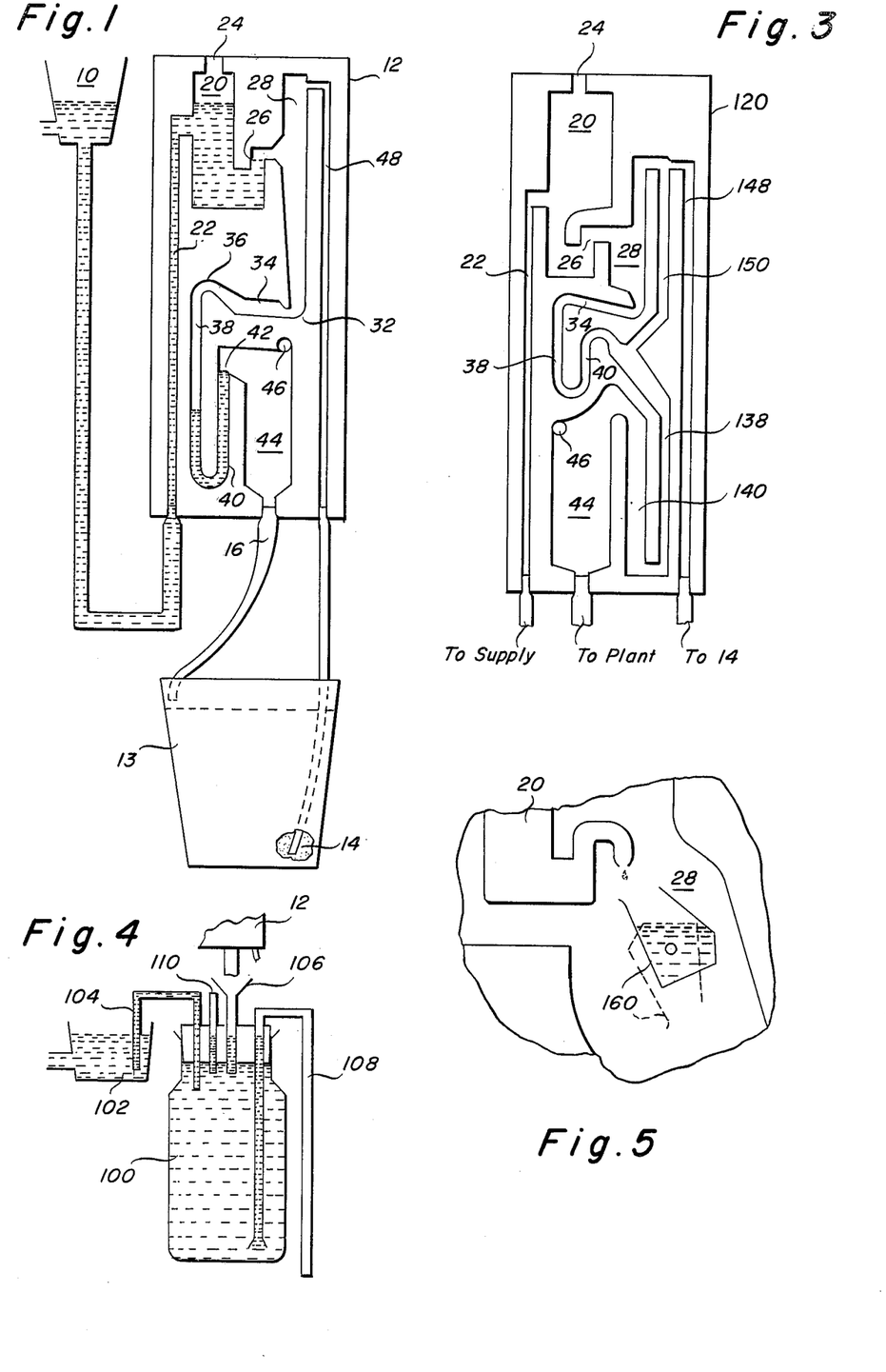
FIG. 1 shows the apparatus with its application to a growing plant.
FIG. 3 shows a modified form of valve device.
FIG. 4 shows an auxiliary supply to be used with the primary apparatus.
FIG. 5 shows another modified form.

The automatic liquid delivery apparatus 12 for dispensing liquid from a source of liquid is illustrated in FIG. 1 for feeding liquid to a plant growing medium. A source of liquid 10 is connected through a restricted passage 22 to container 20, which is open to the atmosphere at 24. A discharge outlet 26 in container 20 below the liquid level opens into a valve device comprising a liquid conveying means or passage extending downwardly to a dispensing outlet 16.

This valve device is formed with a chamber 28 to receive liquid from discharge 26, the chamber extending from above the discharge outlet 26 to its lower end 32, where a horizontal branch forming chamber 34 turns upward at 36 and then downward. The descending passage 38 then turns into the ascending passage 40 to form a trap, the upwardly extending passage 40 opening at 42 into receiver 44. This receiver 44 is open to atmosphere at a vent 46 and has a dispensing outlet at 16 leading to a receiver for the liquid such as the plant pot 13 shown. The upper part or air space of chamber 28 has an air outlet to a conduit 48 which leads to detector 14 for sensing liquid in the receiver 13, the detector being open to allow the escape of air if no liquid is present.

The sensing or control element 14 on the end of conduit 48 is closed in the presence of the desired amount of moisture to prevent air escaping from chamber 28 or open when moisture is depleted to allow air to pass from chamber 28 to initiate action of the valve 12, as will be explained in the description of the operation. This element 14 may, for example, be a porous element having fine orifices to close the conduit to egress of air when moisture is present. The degree of moisture required to close the conduit will be determined by the size of orifices selected. It may also have a single, larger orifice which will close only when a substantial amount of liquid closes the opening. Other types of elements which will prevent the passage of air in the presence of liquid in any form may also be used to control the egress of air from the conduit 48, so that when less than the desired amount of moisture is present, chamber 28 will be opened to the atmosphere.

Operation

Figure 2:
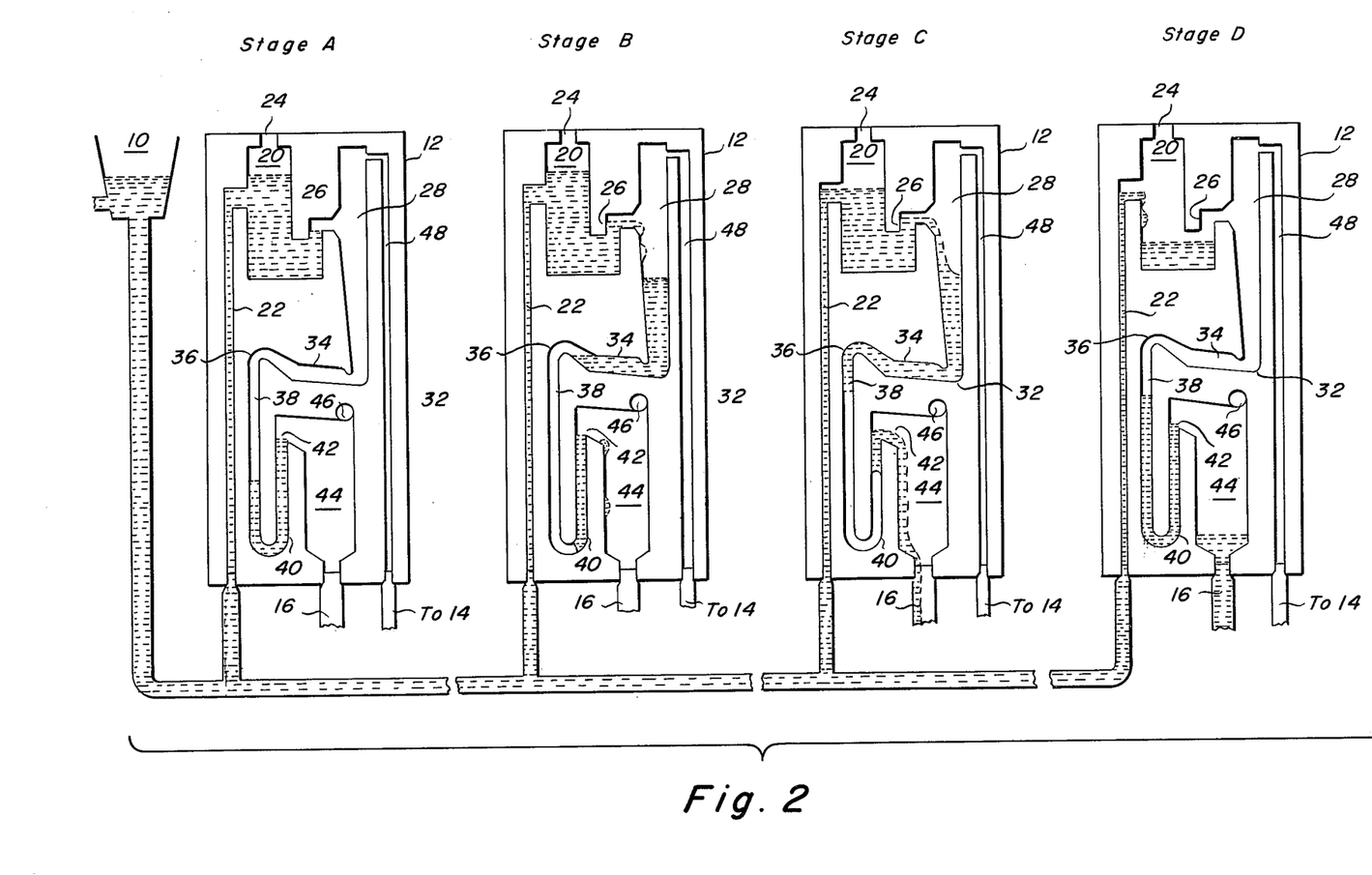
FIG. 2 shows an automatic liquid delivery apparatus in different stages of operation.

The operation of the automatic liquid delivery apparatus 12 may be understood from the actions depicted in FIG. 2, in which a single apparatus is shown in four sequential stages, A, B, C, and D, supplied from the liquid source 10. In stage A, air is entrapped in a passage between the hydrostatically balanced columns of liquid in an upper container 20 and in the ascending column 40, which acts as one arm of a lower container or trap formed by vertical conduits 38 and 40. This stage shows the static state of the device, wherein pressure of liquid in container 20 forces air entrapped in chambers 28, 34 and the upper part of conduit 38 against the counterbalancing liquid in the trap in which the liquid in conduit 40 maintains the air under pressure.

The liquid level in container 20 will remain the same as the level in source 10, and a state of static equilibrium will be maintained as long as moisture closes the sensing element 14 of conduit 48. When moisture is depleted below the desired amount in the medium surrounding element 14, air can escape from chamber 28 through conduit 48, and liquid will pass through the discharge outlet 26 of container 20 into chamber 28.

In stage B, liquid drips from container 20 into chamber 28, replacing the air it forces out, and flows down to the lower end 32 of chamber 28, sealing off the entrance to chamber 34, so no more air can enter that chamber and the liquid gradually rises in chamber 28 to build up a flow triggering liquid head. The increasing pressure of the rising liquid head in chamber 28 forces the liquid in conduit 38 lower, while a volume of liquid equal to that forced out of conduit 38 moves from chamber 28 into chamber 34. Chamber 34 must have a larger capacity than the volume of liquid originally contained in conduit 38 to insure that air remains between the advancing liquid in chamber 34 and the entrance to conduit 38, thereby preventing liquid from leaking prematurely into conduit 38 before air can enter conduit 40. Immediately before the flow, air under the increasing pressure of the rising liquid head in chamber 28 forces all the liquid out of conduit 38 and is about to enter the bottom of conduit 40, wherein the rise of air signals the start of free liquid flow.

Stage C shows the start of the flow cycle with air rising in conduit 40, expelling the counterbalancing head of liquid and thereby removing the back pressure. At the same time, liquid from container 20 and chambers 28 and 34 starts to flow into and down conduit 38 with increasing momentum and thence out of conduit 40 via receiver 44, which is large enough to hold the entire valve contents until it can flow out outlet 16 through the irrigating tube to the plant. Receiver 44 is open to the atmosphere through vent 46 to permit the valve contents to flow in rapidly, unblocked by trapped air, then flow at leisure through dispensing outlet 16.

It should be noted that, as flow begins, the level in container 20 falls because conduit 22 is made small purposely to restrict the flow in order that liquid cannot enter container 20 nearly as fast as it can flow out of the valve. Thus the liquid level in container 20 falls until it is below the entrance to chamber 28, after which air flows into chamber 28 until liquid flow is completed. Air may always enter container 20 from the atmosphere through vent 24.

Stage D shows the valve shutting itself off immediately after the outflow cycle when no pressure remains to force more liquid out of conduits 38 and 40. Liquid is flowing out of receiver 44 to the plant and also is slowly flowing through small conduit 22 from constant level source 10 to refill container 20.

The liquid level in container 20, at the instant outflow of liquid into chamber 28 is completed, drops below the entrance to chamber 28 because the cohesion of liquid molecules flowing from container 20 into chamber 28 prevents the entry of air into chamber 28 until enough liquid has been drawn out of container 20 to bring the level in container 20 considerably below the entrance to chamber 28. Molecular cohesion enables the final quantity of liquid drawn out actually to flow uphill. The time during which liquid in container 20 remains below the entrance to chamber 28 permits air to flow into chamber 28 and liquid to flow out. Several seconds after the valve contents have flowed into receiver 44, the level in container 20 rises sufficiently to block the discharge opening 26 to chamber 28, again entrapping air, and continues to rise until it attains the same level as constant level source 10, reestablishing the state of equilibrium shown in stage A.

Liquid Feeding System

A liquid feeding system for supplying liquid to a plurality of plants fed by a number of automatic liquid delivery apparatus is shown in FIG. 6, where each apparatus supplies liquid to one or more plants. Each automatic liquid delivery apparatus is especially adapted to furnish the required amount of liquid due to selection of a detector for each plant to monitor the amount of moisture required by that plant.

In this system, each automatic liquid delivery apparatus is connected to a liquid source through conduit 22a leading to the liquid container 20a. This conduit 22a may be closed at the container 20a by a float valve 21 of known type to maintain the proper liquid level in container 20a, the conduit 22a and float valve being restricted to limit flow of liquid, as described in the apparatus of FIG. 1, so that container 20a may be emptied faster than liquid from the liquid source may flow in through float valve 21.

Several different plants are shown to illustrate the versatility of this system. The plant in pot 13a is supplied by the apparatus 12 under control of a detector 14a, which is positioned to maintain the correct moisture level and is selected so that the flow of liquid to the pot will be cut off when sufficient moisture is present. The plant shown at 13b may be a plant requiring a small degree of moisture, such as a cactus, and the detector 14b will limit the moisture to the slight amount required.

In a closed container such as 13c, a moist atmosphere may be provided, with the moisture level for the humid growing medium, as for air plants, maintained by a detector 14c, which is positioned to determine the proper moisture level for the atmosphere required. For plants grown in water, a vessel 13d is supplied with liquid to the proper level, the detector 14d being closed by liquid at that level and open to escape of air from the space 28 in the apparatus 12 when liquid level falls below that level. This system may be extended to supply plants under all conditions, as by using a plurality of detectors with one delivery apparatus to assure that all plants supplied by the apparatus are adequately watered, or may be connected to an aquarium, for example, to keep the water level at the proper height.

Alternate Form of Valve Device To Accommodate Greater Fluctuations in Supply Level The valve device in the automatic delivery apparatus 120 of FIG. 3 operates substantially independently of the pressure in the liquid container 20 or supply so that even a large increase in pressure will not trigger flow of liquid through the valve. As in the first form of valve, air is confined in chamber 28 to prevent flow of liquid through discharge outlet 26, and release of the air in chamber 28 allows flow of liquid through the trap 38-40. The air pressure on both ends of trap 38-40 is equalized by connecting the chamber 28 through duct 150 to the output end of the passage 40, so that any increase in supply pressure above the trap input will be balanced by pressure on the output end of the trap. To confine the air in chamber 28, the output end of trap 38-40 is connected to a passage 138 and an upward passage 140 which is filled with liquid and prevents air passing from chamber 28. When air from chamber 28 flows out through the detector 14 upon depletion of liquid a liquid head rises in chamber 28, replacing the nearly weightless air, and thereby increasing the pressure on the input end of trap 38-40 relative to the output end, triggering flow, and, liquid from the liquid supply passes through trap 38-40 and passages 138-140 to receiver 44 and dispensing outlet 16. In this way, a high level in container 20, or greater pressure in the supply to discharge outlet 26, will not initiate liquid flow through the delivery apparatus 120. The upward conduit 140 retains liquid to prevent flow of air from chamber 28 and duct 150, when flow from the liquid supply ceases.

Second Alternate Form of Valve Device

Figure 7:
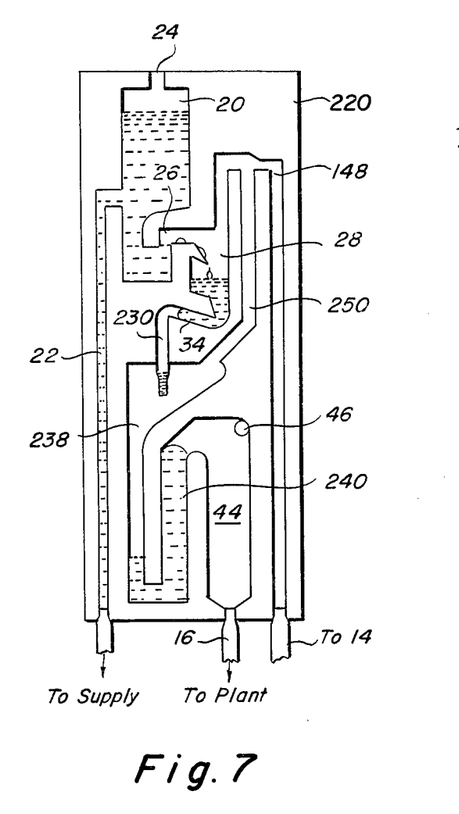
FIG. 7 shows a third modification of the valve device.

The same principle of valve operation is also disclosed in the modified form of the automatic liquid delivery apparatus 220 of FIG. 7, in which the passage in the valve from chambers 28 and 34 leads to a capillary tube 230 which opens into the tube 238 of trap 238-240. The chamber 28 is also connected to passage 238 through duct 250, so the pressure on the opposite ends of capillary tube 230 is equalized. The liquid levels prior to flow are shown in FIG. 7.

As entrapped air is released from chamber 28 through detector 14 and duct 148, drops of liquid passing from container 20 through discharge outlet 26 into the lower part of chamber 28 provide visible evidence that the plant growth medium in which detector 14 is located is in need of moisture. As liquid starts to rise in chamber 28, it traps air in chamber 34 and compresses it against the final portion of liquid from the previous outflow which is retained in the lower end of capillary tube 230 by capillary attraction. As liquid continues to rise in chamber 28, it creates a pressure head which finally overcomes the capillary force and expels the counterbalancing liquid head from tube 230.

Liquid from chambers 28 and 34 now flows rapidly into passage 238, overcoming the counterbalancing head in passage 240 which supports the liquid in container 20, enabling all liquid to flow out to the dispensing outlet and the zone of liquid use, except for the final portion which is retained in trap 238-240 and in capillary tube 230 by capillary attraction to await the next cycle.

Alternate Flow Triggering Means

The flow triggering liquid head created by escaping air to overbalance a lower, counterbalancing liquid head seems to be the simplest means to that end, although many different means may be employed to obtain the same result.

One example, as shown in FIG. 5, would be a pivoting container 160 located in the passage between the upper and lower liquid heads to receive liquid when air escapes from chamber 28 and build up weight above the pivoting center of gravity in the container as it fills, eventually pivoting upside down and discharging its contents to trigger flow, then righting itself for the next cycle.

Variable Liquid Supply for Automatic Liquid Delivery Apparatus

Figure 9:
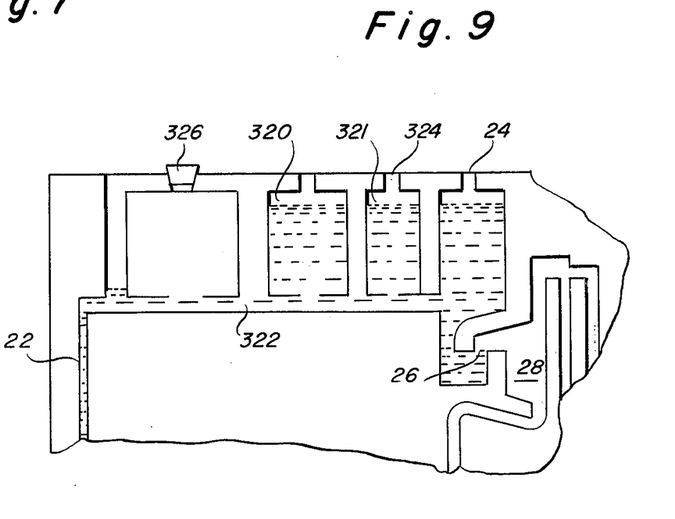
FIG. 9 shows a plurality of containers which may be emptied to discharge liquid by the automatic liquid delivery apparatus.

A series of liquid chambers may be connected to the container 20 to increase the available liquid supply for each cycle of the automatic liquid delivery apparatus, as shown in FIG. 9. The restricted inlet conduit 22 is connected to conduit 322, which leads to openings in the bottoms of a plurality of liquid chambers 320, each of which has a vent 324 to atmosphere. These chambers may be filled to the same level as container 20. Filling of any of these chambers 320 may be prevented by closing the vent 324 with a stopper 326, or a valve for this purpose. When flow is initiated from container 20, liquid from all filled chambers 320 will flow out the discharge outlet 26 to the dispensing outlet 16. Thus the amount of liquid delivered on each cycle may be adjusted by closing off or filling the several chambers 324. This adjustment of the liquid supply enables the automatic liquid delivery apparatus to be adapted to the liquid requirements of any particular plant medium or other uses.

Supplementary Dispensing Device

Although the upper container 20 of the apparatus may be made as large as necessary to accommodate any irrigating requirement either in a single cycle or by repetitive cycling, it may be advantageous for the apparatus to activate a single volume dispensing operation from a supplementary container of any desired size. In this way, a liquid delivery apparatus may dispense a highly concentrated water soluble fertilizing solution into a container of plain water having the correct volume in relation to the volume of the apparatus to dilute the concentrated solution and make it satisfactory for use by plants.

It is also possible to connect a single such supplementary container of plain water into the dispensing system of many apparatus so that a very small volume of fertilizing solution may irrigate many plants in accordance with their individual needs as controlled by their individual detectors.

As shown in FIG. 4, the liquid in container 100 may be dispensed in one operation by initiating the dispensing action from an apparatus as shown in FIG. 1 under control of the sensing element 14.

In this supplementary system, the container 100 is maintained at the level of a supply source 102 by a restricted flow siphon 104. An output siphon 108 extends from the container to the dispensing outlet to supply the liquid to the receiver or growing medium. This second siphon 108 is not filled. An input tube 106 receives liquid from a delivery apparatus to raise the liquid level in container 100. When the apparatus is activated by the detector element 14 thereof, as the result of depletion of moisture, the liquid is discharged to the input tube 106 to raise the level in container 100 above the output siphon 108, thereby starting flow from container 100 to dispense the entire volume of liquid. After the contents of the container 100 are dispensed, the container may refill slowly from the supply source 102 through a restricted flow siphon 104. Vent tube 110 allows air to escape so liquid may enter freely through input tube 106.

Alternate Supplemental Dispensing Device

Figure 8:
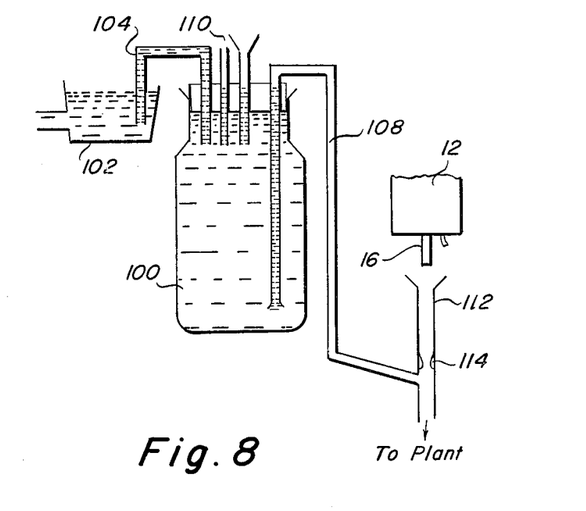
FIG. 8 shows a modified form of control of an auxiliary supply.

A supplemental liquid supply in which a siphon dispenses the liquid may also be actuated by an aspirator to initiate the siphon action, as shown in FIG. 8. In this form, the siphon 108 connects to a tube 112 below a restricted passage 114. The dispensing outlet 16 from an automatic liquid delivery apparatus dispenses liquid to the upper end of tube 112, the aspirator 114 producing a reduced pressure in tube 112 to draw liquid through tube 108 from the supplemental supply container 100. The siphon will then deliver the liquid from the supply until it is empty.

Many liquid delivery apparatus may activate the same supplementary supply, or other supplementary containers may be activated by a single delivery apparatus. After emptying, the container 100 will be refilled from source 102.

Summary

The automatic liquid delivery apparatus will supply liquid in the proper amount to maintain the moisture or liquid required in a zone of liquid use for many purposes. The liquid feeding system for supplying plants maintains the proper moisture for the plants for indefinite periods without attention. The detectors are designed for the requirements of each plant. If the detector has a porous, ceramic tip to be closed by liquid, the size of the pores will determine the amount of moisture which will block the escape of air. Thus the dry plants will be controlled by a ceramic detector having very fine pores. The action of the detector and the opening of the detector to escaping air are particularly desirable, as the egress of air will keep the pores open, thereby avoiding blockage of the detector or air tube and failure of the apparatus.

The operation of the valve device in the delivery apparatus requires a small, fixed amount of air and releases only a small quantity of air under pressure to initiate flow of the liquid, and the quantity of air is independent of the quantity of liquid dispensed. This action is rapid and positive, with discharge of the entire volume of liquid in the container or other supply as a result of the release of a small volume of air. Since so little air need escape, extremely small detectors may be used, easy to insert even in miniature containers.

While specifically illustrated in its application to irrigating plants, this system finds wide application in any operation which requires the continued supply of liquid. For example, a humidifier or other apparatus requiring liquid may be controlled by a detector designed to sense the condition which requires liquid to be delivered in that zone.

The valve device which controls flow from container 20 in the apparatus may also be used wherever the flow of liquid is to be controlled. This valve operates on the principle of preventing flow of liquid by air pressure and releasing the air pressure to initiate flow. The control or the air pressure may be automatic, under control of any condition which will open the air chamber to the escape of air.

I claim:

1. An automatic liquid delivery apparatus for automatically supplying liquid for a plant growing medium as needed, comprising: a liquid container open to atmospheric pressure having a discharge outlet for the gravity flow of liquid from said container, a liquid source connected to said container through a restricted passage for supplying liquid to maintain liquid in said container at a predetermined level, conveying means having a passage leading from said discharge outlet to a dispensing outlet below said source for passage of liquid from said container to supply liquid for said growing medium, said passage including an air pressure retaining space to receive liquid from said liquid container and having means confining air in said space, air confined in said space under pressure blocking the discharge of liquid from said container, a passage leading from said space for egress of air, and an air outlet communicating with said passage and located at the predetermined liquid level for said growing medium, said air outlet being closed by liquid to prevent egress of air, so that lack of liquid below the amount required for plant growth allows air to pass from said space and the discharge of liquid from said container to dispense liquid for said medium from said dispensing outlet, said restricted passage limiting flow to said container, so that said container may empty when liquid is discharged and air may enter said air retaining space and said container will be filled from said source after emptying through said discharge outlet.

2. A valve device to control the flow of liquid by gravity, comprising a passage leading from an inlet to an outlet below the inlet, an air space open to said passage at an upper end thereof for confining air at a pressure sufficient to arrest the flow of liquid in said inlet, said passage extending downwardly from said air space to an upwardly extending branch forming a lateral chamber, a descending passage connected to said lateral chamber and connected at its lower end to an ascending passage to form a trap, said ascending passage opening to said outlet, and an air outlet from said air space having control means to selectively release air confined under pressure in said air space thereby allowing liquid flow from said inlet to said outlet.

3. An automatic liquid delivery apparatus comprising: a liquid supply container open to the atmosphere, a passage between the liquid supply container and a zone of liquid use below the container, the passage being open and unobstructed through its entire length for gravity flow of liquid from said supply container to a dispensing outlet, an air pressure retaining space open to said supply container and said passage to retain air under a pressure sufficient to arrest flow of liquid from said supply container into said air pressure retaining space, means including a liquid for confining air in said space, air pressure retaining means located in the zone of liquid use communicating with said air pressure retaining space by way of an open line inaccessible to liquid, said air pressure retaining means allowing air to escape only when moisture in said zone of liquid use has been depleted below a predetermined level, at which time a volume of liquid replaces the air escaping from said air pressure retaining space, the weight of said volume of liquid serving to initiate liquid flow, said supply container having a flow restricting means before its input, allowing liquid to flow out of said passage faster than it can flow into said container, thereby enabling a new supply of air to be drawn in and entrapped after each flow cycle.

4. The automatic liquid delivery apparatus of claim 3 wherein said means including a liquid for confining air in said space comprises an upwardly extending branch forming a lateral chamber within said passage.

5. The automatic liquid delivery apparatus of claim 3 wherein said means including a liquid for confining air in said space comprises a capillary tube.

6. An automatic liquid delivery apparatus comprising: a liquid supply container open to the atmosphere having a discharge outlet below the surface of the liquid therein so that liquid may flow by gravity through said discharge outlet, conveying means to convey liquid discharged through said discharge outlet to a dispensing outlet below said discharge outlet, an air pressure retaining space open to said liquid supply container and said conveying means for retaining air at a pressure sufficient to arrest the flow of liquid through said discharge outlet, a liquid retaining trap below said air pressure retaining space for preventing release of air from said air pressure retaining space, an air outlet, and automatic control means to open and close said air outlet for sensing a condition requiring delivery of liquid, so that said control means opens said air outlet to release air from said space thereby permitting liquid to discharge through said discharge outlet and conveying means to said dispensing outlet.

7. An automatic liquid delivery apparatus for automatically supplying liquid to a zone of liquid use as needed, comprising an upper liquid container open to atmospheric pressure having a discharge outlet for the gravity flow of liquid from said upper container, means associated with said outlet preventing the escape of air back into said upper container when liquid from said container discharges through said outlet, a liquid supply connected to said container through a flow delaying means for supplying liquid to maintain liquid in said container at a predetermined level, said apparatus including a passage into which said discharge outlet empties connecting said upper container with a lower liquid container, said lower liquid container providing a liquid head to counterbalance the liquid head in said upper container, said passage containing air under pressure from the counterbalancing head in said lower container to prevent gravity flow of liquid from said upper container into said passage, said passage having an opening inaccessible to liquid and communicating with a liquid controlled air pressure retaining means located in the zone of liquid use, said air pressure retaining means preventing the escape of air from said passage when the zone of liquid use contains the desired amount of moisture and permitting air to escape when moisture has been depleted below the desired amount, said passage accepting entry of liquid from said upper container to replace escaping air, thus enabling a liquid head to rise in said passage to overcome said counterbalancing liquid head in said lower container, said counterbalancing liquid head thereby being expelled from said lower container, liquid in said passage and said upper container descending by gravity through a dispensing outlet to a zone of liquid use, said upper container being refilled from said supply through said flow delaying means to allow the liquid level in said upper container to remain below the entrance to said discharge outlet sufficiently long to permit air to enter said passage, thereby affording liquid in said passage time to flow out, after which said entrance to said discharge outlet is again blocked by the liquid in said upper container rising to supply level and trapping air under pressure in said passage, again preventing liquid from entering said passage unless air is still escaping through said liquid controlled air restricting means to continue intermittent cycles of liquid flow until the desired amount of moisture is delivered to the zone of liquid use.

8. An automatic liquid delivery apparatus having a discharge outlet from a liquid supply for the gravity flow of liquid from said supply, a dispensing outlet below said supply for dispensing liquid to a zone of liquid use, conveying means leading from said discharge outlet to said dispensing outlet, the conveying means including a liquid trap for retaining a column of liquid spaced below said discharge outlet, an air pressure retaining space between the liquid in said trap and said discharge outlet for retaining air at a pressure sufficient to arrest the flow of liquid through said discharge outlet, a detector in proximity to said zone of liquid use for sensing the presence of liquid in said zone, said detector being connected to said air pressure retaining space and being closed by the presence of liquid in said zone to prevent the emission of air from said air pressure retaining space and being open by the absence of liquid in said zone to permit release of air from said space, liquid from said liquid supply being discharged through said discharge outlet and conveying means thereby supplying liquid to said dispensing outlet when air is released from said space through said detector.

9. The method of automatically delivering liquid by gravity to a delivery outlet, comprising: opposing gravity flow of liquid from a liquid supply container open to atmosphere by air pressure in a space for receiving liquid through a discharge outlet from said supply container, confining the air under pressure in said space by liquid in a passage between said supply and said delivery outlet, sensing a condition in a zone of liquid use requiring the delivery of liquid, and releasing said air under pressure upon sensing said condition to allow flow of liquid from said liquid supply container through said space and passage and to deliver liquid to said zone of liquid use, and refilling said supply container through a restricted passage from a source of liquid to allow flow to said supply container more slowly than the flow through said discharge outlet, so that upon emptying of said container, air will enter said air space.

10. The method of delivering liquid to a dispensing outlet, comprising: filling a container with liquid, opposing discharge of liquid by gravity through a discharge outlet by air pressure at said discharge outlet, releasing said air pressure to allow said liquid to flow by gravity through said discharge outlet through a passage to a dispensing outlet below said discharge outlet, and filling said container by liquid at a slower rate than the flow through said discharge outlet, so that air flows into said air pressure retaining space when said container empties, and retaining liquid in said passage below said discharge outlet to prevent escape of air and to retain air under pressure at said discharge outlet.

11. The method of automatically delivering liquid from a liquid supply open to the atmosphere by gravity through a passage to a dispensing outlet in a zone of liquid use comprising: providing a discharge opening from said liquid supply into said passage, providing a counterbalancing liquid head in said passage, entrapping air in said passage between the discharge opening from said liquid supply and the counterbalancing liquid head in said passage to prevent the flow of liquid from said supply, releasing the air entrapped in said passage through a liquid controlled air retaining means in said zone of liquid use, building up a flow triggering liquid head in said passage by liquid from said supply discharged into said passage when said entrapped air is released to overcome said counterbalancing head and thereby initiate outflow of liquid through said passage from said supply to exhaust said supply and admit air to said passage, delivering liquid to said supply at a slower rate than the discharge rate of liquid from said supply, said air flowing into said passage being entrapped to prevent further flow of liquid from said supply until the pressure head of said flow triggering liquid head overcomes said counterbalancing head as said entrapped air is released through said air retaining means.

* * * * *